3,128,270
NOVEL 11β, 18-OXIDO-18ξ-METHYL-
PREGNENES
Georges Muller, Nogent-sur-Marne, Jacques Martel,
Bondy, and Roland Bardoneschi, Tremblay Les
Gonesses, France, assignors, by mesne assignments,
to Roussel-UCLAF, S.A., Paris, France, a corporation of France
No Drawing. Filed Nov. 8, 1961, Ser. No. 150,882
Claims priority, application France Nov. 15, 1960
7 Claims. (Cl. 260—239.55)

The invention relates to novel 11β, 18-oxido-18 ξ-methyl-pregnenes having the formula

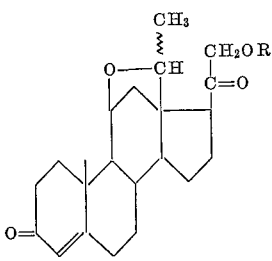

wherein R is selected from the group consisting of hydrogen, an acyl radical of a mineral acid and an acyl radical of an organic carboxylic acid having 1 to 18 carbon atoms. The invention also relates to a novel process for the preparations of compounds of Formula I and novel intermediates thereof.

The 11β, 18-oxido-18 ξ-methyl pregnenes of Formula I are physiologically active compounds possessing an anti-aldosteronic activity.

It is an object of the invention to provide novel 11β, 18-oxido-18 ξ-methyl-pregnenes of Formula I.

It is another object of the invention to provide a novel process for the preparation of 11β, 18-oxido-18 ξ-methyl-pregnenes of Formula I.

It is an additional object of the invention to provide novel intermediates for 11β, 18-oxido-18 ξ-methyl-pregnenes of Formula I, particularly A. 3-ethylenedioxy-11β, 18-oxido-18 ξ-methyl-Δ⁵-pregnene-20β-ol
B. 3-ethylenedioxy-11β, 18-oxido-18 ξ-methyl-Δ⁵-pregnene-20-one
C. 3-ethylenedioxy-11β, 18-oxido-18 ξ-methyl-21-ethoxallyl-Δ⁵-pregnene-20-one
D. 3-ethylenedioxy-11β, 18-oxido-18 ξ-methyl-21-iodo-Δ⁵-pregnene-20-one These and other objects and advantages of the invention will become obvious from the following detailed description.

The 11β, 18-oxido-18 ξ-methyl-pregnenes of the invention have the formula

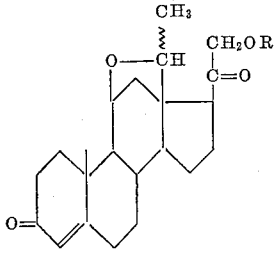

wherein R is selected from the group consisting of hydrogen, an acyl radical of a mineral acid and an acyl radical of an organic carboxylic acid having 1 to 18 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid; p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid, examples of other suitable acids are sulfonic acids, phosphoric acid, nitric acid and sulfuric acid.

The process of the invention comprises saponifying 3-ethylenedioxy-11β, 18-oxido-18 ξ-methyl-20β-acetoxy-Δ⁵-pregnene to form 3-ethylenedioxy-11β, 18-oxido-18 ξ-methyl-Δ⁵-pregnene-20β-ol, oxidizing the latter to form 3-ethylene-dioxy-11β, 18-oxido-18 ξ-methyl-Δ⁵-pregnene-20-one, reacting the latter to a dilower alkyl oxalate under alkaline conditions followed by acidification to form 3-ethylenedioxy-11β, 18-oxido-18 ξ-methyl-21-lower alkoxalyl-Δ⁵-pregnene-20-one, reacting the latter with iodine to form 3-ethylenedioxy-11β, 18-oxido-18, ξ-methyl-21-iodo-Δ⁵-pregnene-20-one, reacting the latter with an alkali metal acetate to form 11β, 18-oxido-18 ξ-methyl-21-acetoxy-Δ⁴-pregnene-3, 20-dione, saponifying the latter to form 11β, 18-oxido-18 ξ-methyl-Δ⁴-pregnene-21-ol-3, 20-dione. The free alcohol can be esterified by the usual procedures such as by reaction with an acid anhydride or acid halide to form the corresponding 21-ester.

A preferred mode of the process of the invention comprises saponifying at reflux temperatures 3-ethylenedioxy-11β, 18-oxido-18 ξ-methyl-20β-acetoxy-Δ⁵-pregnene in a lower alkanol to form 3-ethylenedioxy-11β, 18-oxido-18 ξ-methyl-Δ⁵-pregnene-20β-ol, oxidizing the latter with a chromic oxide in an organic solvent such as pyridine to form 3-ethylenedioxy-11β, 18-oxido-18 ξ-methyl-Δ⁵-pregnene-20-one, reacting said product with diethyl oxalate in the presence of an alkali metal alcoholate followed by acidification with mono-sodium phosphate to form 3-ethylenedioxy-11β, 18-oxido-18 ξ-methyl-21-ethoxalyl-Δ⁵-pregnene-20-one, reacting the latter with iodine in a lower alkanol under anhydrous conditions to form 3-ethylenedioxy-11β, 18-oxido-18 ξ-methyl-21-iodo-Δ⁵-pregnene-20-one, reacting the 21-iodo product with an alkali metal acetate under anhydrous conditions to form 11β, 18-oxido-18 ξ-methyl-21-acetoxy-Δ⁴-pregnene-3, 20-dione, saponifying the latter to form 11β, 18-oxido-18 ξ-methyl-Δ⁴-pregnene-21-ol-3, 20-dione and recovering the latter. The reaction scheme is illustrated in Table I.

TABLE I

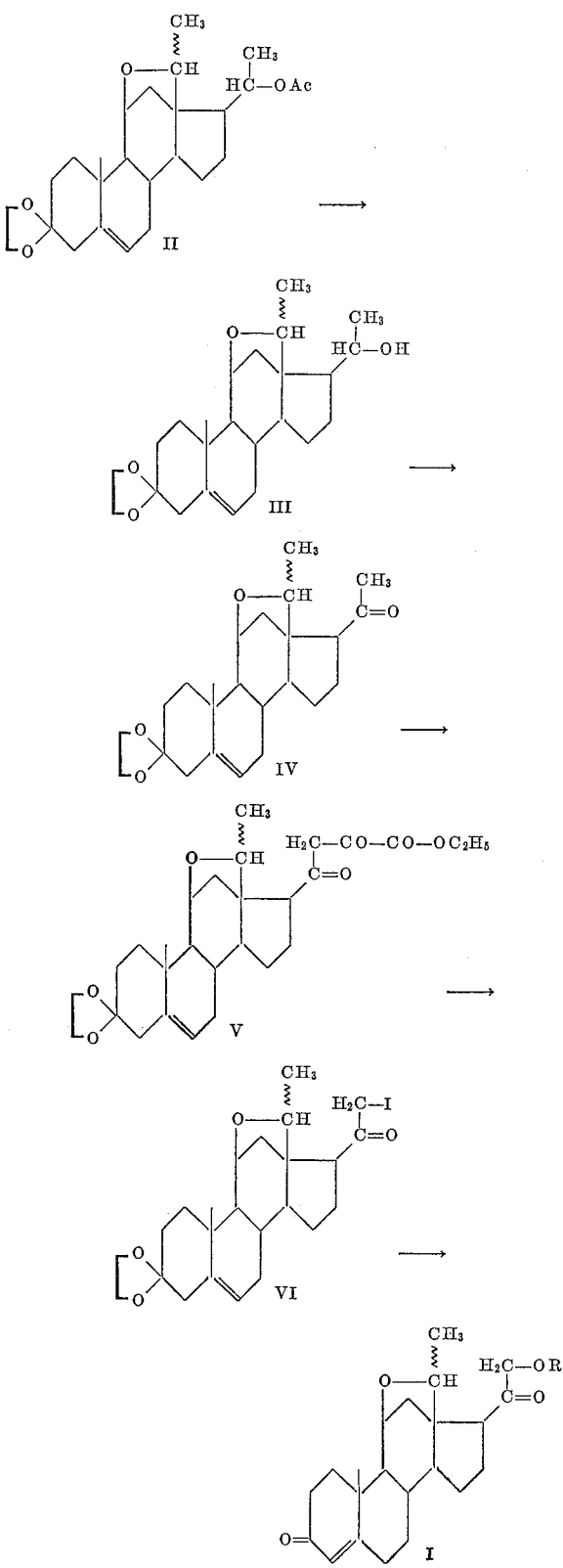

wherein R has the above definition.

The starting material of the process is prepared according to the process described in the commonly assigned, copending application Serial No. 122,664 filed July 10, 1961 now Patent No. 3,084,158.

In the following example there are described several preferred embodiments to illustrate the invention. However, it should be understood that the invention is not intended to be limited to the specific embodiments. The melting points, expressed in ° centigrade, are instantaneous melting points determined on the Kofler block.

*Example.—Preparation of 11β, 18-Oxido-18 ξ-Methyl-Δ⁴-Pregnene-21-Ol-3, 20-Dione and its Acetate*

STEP A: 3-ETHYLENEDIOXY-11β, 18-OXIDO-18 ξ-METHYL-Δ⁵-PREGNENE-20β-OL III 2.7 gm. of 3-ethylenedioxy-11β, 18-oxido-18 ξ-methyl-20β-acetoxy-Δ⁵-pregnene, II, having a melting point of 203° C., were dissolved in 10 cc. of methylene chloride. The starting material was obtained according to the process described the copending commonly assigned United States patent application Serial No. 122,664 filed on July 10, 1961. To the solution 80 cc. of methanol, 3 cc. of sodium hydroxide solution and 1 cc. of water were added. The reaction mixture was heated to reflux for a period of 30 minutes. After reducing the solution to a small volume and cooling, 3-ethylenedioxy-11β, 18-oxido-18 ξ-methyl-Δ⁵-pregnene-20β-ol, III, crystallized.

The product was vacuum filtered, washed with water and dried in order to recover 2.20 gm. of product melting at 187–190° C. and utilizable without further purification for the next step of the synthesis. From the mother liquors an additional 0.17 gm. of product could be recovered.

The product was recrystallized from ether and occurs in the form of pearly white needles, very soluble in chloroform, soluble in alcohol and ether and insoluble in water.

The infrared spectra confirmed the structure of the product.

This compound is not described in the literature.

STEP B: 3-ETHYLENDIOXY-11β, 18-OXIDO-18 ξ-METHYL-Δ⁵-PREGNENE-20-ONE IV 1.1 gm. of 3-ethylenedioxy-11β, 18-oxido-18 ξ-methyl-Δ⁵-pregnene-20β-ol III, were introduced into a mixture of 1.1 gm. of chromium trioxide and 11 cc. of pyridine. Another 11 cc. of pyridine were added and the mixture was agitated for a period of several minutes, then allowed to stand at room temperature overnight. The reaction mitxure was extracted with methylene chloride and the extracts were washed with water, then with a saturated sodium chloride solution, dried and treated with carbon black. After filtration, the solvent was evaporated to dryness and the residue subjected to chromatography through an alumina column. Elution with methylene chloride furnished 0.90 gm. (being a yield of 80%) of 3-ethylenedioxy-11β, 18-oxido-18 ξ-methyl-Δ⁵-pregnene-20-one, IV, having a melting point of 167° C. and a specific rotation $[\alpha]_D^{20} = +54°$ (C=0.5% in chloroform). The product occurred in the form of white needles, soluble in alcohol, ether and chloroform and insoluble in water.

*Analysis.*—$C_{24}H_{34}O_4$; molecular weight=386.51. Calculated: C, 74.57%; H, 8.87%; C, 16.56%. Found: C, 74.5%; H, 9.0%; C, 16.2%.

The infrared spectra confirmed the structure of the product in particular by the presence of bands at 1708–1710 cm.⁻¹ (carbonyl group) and at 1353 cm.⁻¹ ($COCH_3$ group).

This compound is not described in the literature.

STEP C: 3-ETHYLENEDIOXY-11β, 18-OXIDO-18 ξ-METHYL-21-ETHOXALYL-Δ⁵-PREGNENE-20-ONE, V 1.92 cc. of a methanolic solution of sodium methylate containing 5 gm. of sodium per 100 cc. of solution, were added to 30 cc. of benzene. The solution was concentrated to about one half its volume, cooled to 20° C. and 1.03 cc. of diethyl oxalate were introduced. In the solution thus formed, 1.28 gm. of 3-ethylenedioxy-11β, 18-oxido-18 ξ-methyl-Δ⁵-pregnene-20-one, IV, were introduced and the reaction mixture was allowed to stand for a period of 16 hours at room temperature.

The reaction mixture was poured into water and a solution of monosodium phosphate was added until the pH reached 5. The aqueous phase was extracted with ether. The organic solutions were combined and evaporated to dryness under vacuum. The residue consisted of 3-ethylenedioxy-11β, 18-oxido-18 ξ-methyl-21-ethoxalyl-Δ⁵-pregnene-20-one, V, which was used without purification for the following step of the synthesis.

This compound is not described in the literature.

STEP D: 3-ETHYLENEDIOXY-11β, 18-OXIDO-18 ξ-METHYL-21-IODO-Δ⁵-PREGNENE-20-ONE, VI

The 3-ethylenedioxy-11β, 18-oxido-18 ξ-methyl-21-ethoxalyl-Δ⁵-pregnene-20-one obtained in the preceding step was dissolved in 24 cc. of methanol. The solution was cooled to −10° C. Then successively 6.4 gm. of anhydrous potassium acetate and very slowly 17.7 cc. of a solution of 5% iodine in methanol were added. The reaction solution was agitated for a period of 2 hours at 20° C. The mixture was poured into water, extracted with methylene chloride and the extracts distilled to dryness under vacuum. The residue obtained consisted of 3-ethylenedioxy-11β, 18-oxido-18 ξ-methyl - 21 - iodo-Δ⁵-pregnene-20-one, VI, which was utilized as such for the next step of the synthesis.

This compound is not described in the literature.

STEP E: 11β, 18-OXIDO-18 ξ-METHYL-21-ACETOXY-Δ⁴-PREGNENE-3, 20-DIONE

The 3-ethylenedioxy-11β, 18-oxido-18 ξ-methyl-21-iodo-Δ⁵-pregnene-20-one, obtained in the preceding step, was introduced into 25 cc. of acetone. 5 gm. of anhydrous potassium acetate were added and the reaction mixture was heated to reflux for a period of 2 hours. The mixture was then poured into water and extracted with methylene chloride. The extracts were evaporated to dryness under vacuum and the residue was taken up in 25 cc. of acetic acid containing 40% water.

The solution was heated for a period of a half hour in a water bath, poured into water, and extracted with methylene chloride. The extracts were combined, washed with water, dried and evaporated to dryness under vacuum. The residue, after solution in benzene, was subjected to chromatography through alumina. By elution with benzene-18β, 18-oxido-18 ξ-methyl - 21 - acetoxy-Δ⁴-pregnene-3, 20-dione (I) was furnished which was recrystallized from aqueous acetone. The product had a melting point of 150° C. and a specific rotation $[α]_D^{20} = +82°$ (C=0.4% in acetone), and occurred in the form of colorless, prismatic crystals, very soluble in acetone, benzene and chloroform, soluble in alcohol, slightly soluble in ether and insoluble in water.

Analysis.—$C_{24}H_{32}O_5$; molecular weight=400.50. Calculated: C, 71.97%; H, 8.05%. Found: C, 72.1%; H, 8.0%.

The I.R. spectra confirms the structure of compound I where R=$COCH_3$.

The compound is not described in the literature.

By saponification of the acetate of compound I (R=$COCH_3$), according to known procedures, the corresponding free alcohol was obtained where R=H.

This compound is not described in the literature.

Various modifications of the process of the invention may be made without departing from the spirit or scope thereof, and it is to be understood that the invention is to be limited only as defined in the appended claims.

We claim:
1. 3-ethylenedioxy-11β, 18-oxido-18 ξ-methyl-21-ethoxalyl-Δ⁵-pregnene-20-one.
2. 3-ethylenedioxy-11β, 18-oxido-18 ξ-methyl-21-iodo-Δ⁵-pregnene-20-one.
3. The process for the preparation of a compound having the formula

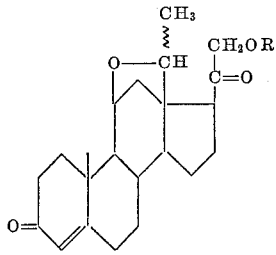

wherein R is selected from the group consisting of hydrogen, an acyl radical of a mineral acid and an acyl radical of an organic carboxylic acid having 1 to 18 carbon atoms which comprises saponifying 3-ethylenedioxy-11β, 18-oxido-18 ξ-methyl-20β-acetoxy-Δ⁵-pregnene to form 3-ethylenedioxy-11β, 18-oxido-18 ξ-methyl-Δ⁵-pregnene-20β-ol, oxidizing the latter to form 3-ethylenedioxy-11β, 18-oxido-18 ξ-methyl-Δ⁵-pregnene-20-one, reacting the latter with a dilower alkyl oxalate under alkaline conditions followed by acidification to form 3-ethylenedioxy-11β, 18-oxido-18 ξ-methyl-21-lower alkoxalyl-Δ⁵-pregnene-20-one, reacting the latter with iodine to form 3-ethylenedioxy-11β, 18-oxido-18 ξ-methyl-21-iodo-Δ⁵-pregnene-20-one, reacting the 21-iodo product with an alkali metal acetate to form 11β, 18-oxido-18 ξ-methyl-21-acetoxy-Δ⁴-pregnene-3, 20-dione, saponifying the latter to form 11β, 18-oxido-18 ξ-methyl-Δ⁴-pregnene-21-ol-3, 20-dione and recovering a compound of the above formula.
4. The process of claim 3 wherein the oxidation is effected with a chromic oxide.
5. The process of claim 3 wherein the dilower alkyl oxalate is diethyl oxalate.
6. The process of claim 3 wherein the alkali metal acetate is potassium acetate.
7. A process for the preparation of 11β, 18-oxido-18 ξ-methyl-Δ⁴-pregnene-21-ol-3, 20-dione which comprises saponifying 3-ethylenedioxy-11β, 18-oxido-18 ξ-methyl-20β-acetoxy-Δ⁵-pregnene in a lower alkanol to form 3-ethylenedioxy-11β, 18-oxido-18 ξ-methyl-Δ⁵-pregnene-20β-ol, oxidizing the latter with a chromic oxide to form 3-ethylenedioxy-11β, 18-oxido-18 ξ-methyl-Δ⁵-pregnene-20-one, reacting the latter with diethyl oxalate in the presence of an alkali metal alcoholate followed by acidification to form 3-ethylenedioxy-11β, 18-oxido-18 ξ-methyl-21-ethoxalyl-Δ⁵-pregnene-20-one, reacting the latter with iodine to form 3-ethylenedioxy-11β, 18-oxido-18 ξ-methyl-21-iodo-Δ⁵-pregnene-20-one, reacting the 21-iodo product with an alkali metal acetate to form 11β, 18-oxido-18 ξ-methyl-21-acetoxy-Δ⁴-pregnene-3, 20-dione, saponifying the latter to form 11β, 18-oxido-18 ξ-methyl-Δ⁴-pregnene-21-ol-3, 20-dione and recovering the latter.

References Cited in the file of this patent
UNITED STATES PATENTS
2,959,586    Kerwin et al. _____ Nov. 8, 1960